United States Patent [19]

Dwyer et al.

[11] Patent Number: 4,650,656

[45] Date of Patent: Mar. 17, 1987

[54] LARGE CRYSTAL ZSM-5 FROM TEMPLATE ADDITION TO THE GEL

[75] Inventors: Francis G. Dwyer, West Chester, Pa.; Donald J. Klocke, Somerdale, N.J.

[73] Assignee: Mobil Oil Corporation, New York, N.Y.

[21] Appl. No.: 724,932

[22] Filed: Apr. 19, 1985

Related U.S. Application Data

[63] Continuation of Ser. No. 484,655, Apr. 13, 1983, abandoned, which is a continuation of Ser. No. 120,424, Feb. 11, 1980, abandoned, which is a continuation-in-part of Ser. No. 953,059, Oct. 19, 1978, abandoned, which is a continuation of Ser. No. 800,259, May 25, 1977, abandoned.

[51] Int. Cl.$^4$ ............................................. C01B 33/28
[52] U.S. Cl. ..................................... 423/329; 423/328
[58] Field of Search ................................ 423/328–330, 423/328 T, 329 T; 502/62, 77

[56] References Cited

U.S. PATENT DOCUMENTS

| | | | |
|---|---|---|---|
| 3,578,723 | 5/1971 | Bowes et al. | 423/328 T |
| 3,702,886 | 11/1972 | Argauer et al. | 423/328 |
| 3,709,979 | 1/1973 | Chu | 423/328 T |
| 4,025,571 | 5/1977 | Lago | 423/328 X |
| 4,046,859 | 9/1977 | Plank et al. | 423/328 |
| 4,082,805 | 4/1978 | Kaeding | 423/328 X |
| 4,560,542 | 12/1985 | Robson | 502/60 |

FOREIGN PATENT DOCUMENTS

| | | | |
|---|---|---|---|
| 0011362 | 5/1980 | European Pat. Off. | 423/328 T |
| 0026963 | 4/1981 | European Pat. Off. | 423/329 T |
| 2822725 | 12/1978 | Fed. Rep. of Germany | 423/329 T |
| 1365318 | 8/1974 | United Kingdom | 423/329 |

*Primary Examiner*—John Doll
*Assistant Examiner*—Lance Johnson
*Attorney, Agent, or Firm*—A. J. McKillop; M. G. Gilman; L. P. Hobbes

[57] ABSTRACT

Large crystal aluminosilicate zeolites of the ZSM-5 type, as crystallized having at least one crystalline dimension in excess of about 1 micron are prepared by introducing an alkyl ammonium compound or its precursor into the crystallization mixture under high agitation and controlled conditions of concentration and temperature.

10 Claims, No Drawings

LARGE CRYSTAL ZSM-5 FROM TEMPLATE ADDITION TO THE GEL

This is a continuation of co-pending Application, Ser. No. 484,655, filed Apr. 13, 1983, now abandoned, which is a continuation of Application, Ser. No. 120,424, filed Feb. 11, 1980, now abandoned, which in turn is a continuation-in-part of application Ser. No. 953,059, filed Oct. 19, 1978, now abandoned, which is a continuation of application Ser. No. 800,259, filed May 25, 1977, now abandoned.

BACKGROUND OF THE INVENTION

1. Field of the Invention

This invention is directed to crystalline aluminosilicate zeolites and to a method of preparing same wherein crystalline aluminosilicate zeolites of high purity are crystallized in the form of large particles having an ultimate crystal size greater than about one micron, that is from about 1 micron to 2 microns or larger. ZSM-5 catalysts having the above-described crystal size are highly useful in selective toluene disproportionation and methanol conversion processes and other selective aromatics conversion processes.

2. Description of the Prior Art

ZSM-5 crystalline aluminosilicate zeolites are well known in the art, being particularly described in U.S. Pat. No. 3,702,886, the entire contents of which are incorporated herein by reference; and although large particle ZSM-5 type zeolites have previously been prepared, such processes have generally not been commercially viable procedures. It was previously thought that ultimate zeolite crystal size was predominantly dependent on the nature of the reaction mixture employed. It has now been discovered that crystal size is also significantly affected by the rate of addition of the organic compound, that is, its effective concentration in the crystallization media, and the temperature and pH conditions and the degree of agitation of the crystallization medium.

SUMMARY OF THE INVENTION

Accordingly, this application is directed to large crystal aluminosilicate zeolite catalysts of the ZSM-5 type and to a process of preparing such catalysts which are characterized by having at least one crystalline dimension of at least 1 micron and preferably from 1 to 2 microns or more which generally comprises preparing an aluminosilicate gel in any convenient manner, heating it to an elevated temperature of at least about 220° F., adding an organic component (e.g., tetrapropyl ammonium bromide) to the gel in such manner that only low concentrations thereof exist during crystallization, and thereafter rapidly raising the temperature of the mixture to the crystallization temperature of at least about 300° F.

The term large crystal is a relative term defined herein to include crystals having a diameter in excess of 1 micron, e.g., of from about 1 to 2 microns or more. Such crystal size has proven advantageous for ZSM-5 type catalysts useful in hydroconversion processes. For example, as mentioned hereinabove ZSM-5 catalysts comprising crystals of such size are highly useful in selective toluene disproportionation and methanol conversion processes.

The class of zeolites defined herein is exemplified by ZSM-5, ZSM-11, ZSM-12, ZSM-35, ZSM-38, and other similar materials. As noted hereinabove, U.S. Pat. No. 3,702,886 describes and claims ZSM-5.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-35 is more particularly described in U.S. Pat. No. 4,016,245, the entire contents of which are incorporated herein by reference.

ZSM-38 is more particularly described in U.S. application Ser. No. 560,412, filed Mar. 20, 1975, the entire contents of which are incorporated herein by reference.

The organic component employed in preparing the large size zeolite crystals in accordance with this invention is usually selected from alkyl ammonium compounds and more particularly from quaternary compounds including tetraalkylhalogenated ammonium compounds such as tetramethylammonium or tetrapropylammonium bromide. However, any other suitable organic compound known to those skilled in the art may be used. Furthermore, instead of the organic compound itself, precursors thereof may also be advantageously used including $C_1$–$C_{10}$ alkyl ammonium compound precursors. In the case of tetra-n-propylammonium bromide, tri-n-proplyamine and n-propyl bromide may be used.

The method of preparation of the instant large crystal ZSM-5 catalysts incorporates techniques to inhibit nucleation of the ZSM-5 while promoting crystal growth from the crystallization reaction mixture. Specifically, the technique utilizes the fact that crystal growth is promoted by higher temperatures and nucleation is promoted by high concentrations of the quaternary or other organic compound essential to the crystallization of the zeolite. One method that successfully produces large ZSM-5 crystals is to prepare the aluminosilicate gel without the necessary organic component, heat to an elevated temperature, or within the range of about 260±60° F. usually >220° F., then introduced the organic compound in low and controlled concentrations or in such a manner that only low concentrations of the organic compound effectively exist at any time during the crystallization, and then rapidly raise to a crystallization temperature usually >300° F. or within the range of about 320±100° F. Another method of controlling the organic concentration which is a preferred embodiment is to introduce a mixture of the precursor materials for the organic compound synthesis, e.g., for tetrapropylammonium bromide, tri-n-propylamine and n-propyl bromide, to the aluminosilicate gel at the elevated temperature and under conditions of moderately high agitation and controlled crystallization temperature. The high agitation (from about 90–140 rpm) disperses the organic precursors uniformly throughout the mix in such a way that reaction to form the quarternary compound is inhibited; therefore, a uniform low concentration of the quaternary is maintained throughout the crystallization. The quaternary compound (i.e., organic component, or the precursor materials) can be introduced during or before crystallization. Also, the organics can be introduced at the crystallization temperature and/or at small controlled rates.

DESCRIPTION OF SPECIFIC EMBODIMENTS

The high temperature preparations in the following three tables demonstrate the effect of concentration of the essential organic species. The concentration has been varied by replacement of tetra-n-propylammonium bromide with its precursors, tri-n-propylamine and n-propyl bromide, and limiting the extent of reaction by agitation. In said Tables 1 and 2 as well as Table 4 the crystal size is given in terms of the large dimension of the respective crystal while in Table 3 crystal size is given in terms of the crystals large and small dimensions.

Table 1—High Concentration of Organic Species and Variable Agitation

Examples 1, 2 and 3 are normal preparations of ZSM-5 using the quarternary salt, tetra-n-propylammonium bromide. There is no difference in crystal size as agitation is varied since concentration of the nucleating species remains the same. Example 4 demonstrates the capability of reacting the quaternary precursors in the presence of methylethyl ketone to produce a significant concentration of the nucleating species. A quiescent period of time was required for reaction of the precursors.

TABLE 1

| HIGH CONCENTRATION OF ORGANIC SPECIES - VARIABLE AGITATION | | | | |
|---|---|---|---|---|
| Example No. | 1 | 2 | 3 | 4 |
| Mole Ratio of Charge (Basis: 1.0 mole $Al_2O_3$) | | | | |
| $Al_2O_3$ | 1 | 1 | 1 | 1 |
| $SiO_2$ | 94 | 94.0 | 94.0 | 94 |
| Na | 181 | 181 | 181 | 181 |
| Tri-n-propylamine | — | — | — | 9.19 |
| n-propyl bromide | — | — | — | 9.19 |
| Methylethyl ketone | — | — | — | 30.2 |
| TPA Br | 9.17 | 9.17 | 9.16 | — |
| $H_2O$ | 3880 | 3880 | 3880 | 3890 |
| Crystallization Data | | | | |
| Prereaction | | | | |
| Temp. °F. | — | — | — | 260 |
| Time Hr | — | — | — | 14 |
| Agitation RPM | — | — | — | 0 |
| Crystallization | | | | |
| Temp. °F. | 316 | 317 | 321 | 320 |
| Time Hr | <21 | <8 | <16 | <9 |
| Agitation RPM | 76 | 121 | 121 | 167 |
| Mole Ratio of Product (Basis: 1.0 mole $Al_2O_3$) | | | | |
| $Al_2O_3$ | 1 | 1 | 1 | 1 |
| $SiO_2$ | 70.4 | 72.5 | 75.0 | 72.5 |
| $Na_2O$ | 0.62 | 0.71 | 0.55 | 0.59 |
| $N_2O$ | 1.17 | 1.30 | 1.23 | 1.16 |
| C | 34.3 | 30.9 | 34.7 | 34.3 |
| C/N Ratio | 14.7 | 11.9 | 14.1 | 14.8 |
| $(Na_2O + N_2O)/Al_2O_3$ | 1.78 | 2.01 | 1.78 | 1.75 |
| Nitrogen Content, Liquor Wt. % | .10 | 0.11 | .09 | .02 |
| Crystal Size $\mu$ | ~.1 est | ~.1 est | ~.1 est | ~.1 est |

Table 2—Low Concentration of Organic Species and Low Agitation

Examples 5, 6 and 7 produced larger crystals than were attained by preparations shown in Table 1. The larger crystals resulted from a low concentration of the organic species necessary for nucleation. The low concentration, caused by limiting reaction of the precursors by agitating the mixture, is demonstrated by the low nitrogen content of the mother liquor. Although this agitation was not severe enough to disperse the organic precursors throughout the mix, the effect on precursor reaction is apparent when Example 7 is compared with Example 4. Example 7 resulted in crystals of greater than about 1 micron while Example 4 produced crystals with dimensions of only about 0.1 micron. This was due to the lower effective concentration of the organic species in Example 7 as verified by the low nitrogen content of the mother liquor after crystallization.

Table 3—Low Concentration of Organic Species and High Agitation

A higher degree of agitation than that employed by Example 5-7 was employed during preparation of Examples 8, 9, 10, 11 and 12. This degree of agitation resulted in increased dispersion of the precursors and generally larger crystals than those attained with a lower degree of agitation. Clearly the data of Table 3 shows that large crystals can be readily obtained by low concentration of the organic species with high agitation.

TABLE 2

| LOW CONCENTRATION OF ORGANIC SPECIES - LOW AGITATION | | | |
|---|---|---|---|
| Example No. | 5 | 6 | 7 |
| Mole Ratio of Charge (Basis: 1.0 mole $Al_2O_3$) | | | |
| $Al_2O_3$ | 1.0 | 1.0 | 1.0 |
| $SiO_2$ | 94.0 | 94.0 | 94.0 |
| Na | 181 | 181 | 181 |
| Tri-n-proplyamine | 9.17 | 9.17 | 9.19 |
| n-Propyl bromide | 9.17 | 9.17 | 9.19 |
| Methylethyl ketone | — | — | 30.2 |
| TPA Br. | — | — | — |
| $H_2O$ | 3880 | 3880 | 3890 |
| Crystallization Data | | | |
| Prereaction | | | |
| Temp. °F. | — | — | |
| Time Hr | — | — | |
| Agitation RPM | — | — | |
| Crystallization | | | |
| Temp. °F. | 318 | 319 | 316 |
| Time Hr. | <20 | <13 | <18 |
| Agitation RPM | 76 | 76 | 76 |
| Mole Ratio of Product (Basis 1.0 mole $Al_2O_3$) | | | |
| $Al_2O_3$ | 1.0 | 1.0 | 1.0 |
| $SiO_2$ | 74.5 | 70.7 | 67.8 |
| $Na_2O$ | 0.29 | 0.20 | 0.40 |
| $N_2O$ | 1.38 | 1.31 | 0.95 |
| C | 26.1 | 25.2 | 22.5 |
| C/N Ratio | 9.48 | 9.64 | 11.8 |
| $(Na_2O + N_2O)Al_2O_3$ | 1.66 | 1.52 | 1.35 |
| Nitrogen Content, Liquor Wt. % | .003 | .001 | .001 |
| Crystal Size $\mu$ | >1 | >1 | >1 |

The effect of temperature on rate of crystal growth is shown in Table 4. Both preparations employed tetra-n-propyl ammonium bromide. Example 15, crystallized at 210° F. required 192 hours and produced crystals less than 0.05 micron in diameter. Crystallization of Example 14, a substantially identical reaction mixture at 317° F. resulted in crystals of at least twice that size (~0.1 micron).

This invention is not limited by the specific examples described herein. Equivalents obvious to those of skill in the art are included within the scope of this specification and the appended claims.

TABLE 3

LOW CONCENTRATION OF ORGANIC SPECIES - HIGH AGITATION

| Example No. | 8 | 9 | 10 | 11 | 12 |
|---|---|---|---|---|---|
| Mole Ratio of Charge (Basis: 1.0 mole $Al_2O_3$) | | | | | |
| $Al_2O_3$ | 1 | 1 | 1 | 1 | 1 |
| $SiO_2$ | 94.0 | 94.0 | 94.0 | 94.0 | 94.0 |
| Na | 181 | 181 | 181 | 181 | 181 |
| Tri-n-propylamine | 9.17 | 9.17 | 9.17 | 9.17 | 9.17 |
| n-Propyl bromide | 9.17 | 9.17 | 9.17 | 9.17 | 9.17 |
| Methylethyl ketone | — | — | — | 30.2 | 30.2 |
| TPA Br. | — | — | — | — | — |
| $H_2O$ | 3880 | 3880 | 3880 | 3880 | 3880 |
| Crystallization Data | | | | | |
| Prereaction | | | | | |
| Temp. °F. | | | | | |
| Time Hr. | | | | | |
| Agitation RPM | | | | | |
| Crystallization | | | | | |
| Temp. °F. | 320 | 320 | 320 | 320 | 320 |
| Time Hr. | <14 | <17 | <18 | <17 | <17 |
| Agitation RPM | 121 | 121 | 121 | 121 | 121 |
| Mole Ratio of Product (Basis 1.0 mole $Al_2O_3$) | | | | | |
| $Al_2O_3$ | 1 | 1 | 1 | 1 | 1 |
| $SiO_2$ | 70.3 | 74.4 | 71.5 | 76.8 | 71.9 |
| $Na_2O$ | 0.35 | 0.31 | 0.25 | 0.30 | 0.29 |
| $N_2O$ | 0.79 | 1.13 | 1.33 | 1.17 | 1.08 |
| C | 15.5 | 21.9 | 26.2 | 27.3 | 25.2 |
| C/N Ratio | 9.78 | 9.69 | 9.88 | 11.7 | 11.7 |
| $(Na_2O + N_2O)/Al_2O_3$ | 1.14 | 1.44 | 1.58 | 1.47 | 1.37 |
| Nitrogen Content, Liquor Wt. % | .001 | <.001 | <.001 | <.001 | <.001 |
| Crystal Size μ | $A$ ~3-5 | ~3-5 | ~3-4 | ~3- | ~3-5 |
| | $B$ ~1-2 | ~1-2 | ~1 | ~1-2 | ~1-2 |

$A$ Large dimension of crystal
$B$ Small dimension of crystal

TABLE 4

EFFECT OF CRYSTALLIZATION TEMPERATURE

| Example No. | 14 | 15 |
|---|---|---|
| Mole Ratio of Charge (Basis: 1.0 mole $Al_2O_3$) | | |
| $Al_2O_3$ | 1 | 1 |
| $SiO_2$ | 94.0 | 99 |
| Na | 181 | 162 |
| Tri-n-propylamine | — | — |
| n-propyl bromide | — | — |
| Methylethyl ketone | — | — |
| TPA Br | 9.17 | 9.68 |
| $H_2O$ | 3880 | 4096 |
| Crystallization Data | | |
| Crystallization | | |
| Temp. °F. | 317 | 210 |
| Time Hr | <8 | 192 |
| Mole Ratio of Product (Basis: 1.0 mole $Al_2O_3$) | | |
| $Al_2O_3$ | 1 | 1 |
| $SiO_2$ | 72.5 | 73.9 |
| $Na_2O$ | 0.71 | 0.87 |
| $N_2O$ | 1.30 | 1.32 |
| C | 30.9 | — |
| C/N Ratio | 11.9 | — |
| $(Na_2O + N_2O)/Al_2O_3$ | 2.01 | 2.18 |
| Nitrogen Content, Liquor Wt. % | 0.11 | — |
| Crystal Size μ | ~.1 est | <.05 |

What is claimed is:

1. A process for preparing ZSM-5 characterized by having at least one crystalline dimension of about 1 micron or more which comprises preparing an aluminosilicate gel, and thereafter adding a mixture of alkyl ammonium compound precursors to said gel and raising the temperature of the resultant gel-mixture to at least about 300° F., a level sufficient to promote crystallization thereof, under agitation, thereby dispersing said precursors uniformly throughout the mixture and inhibiting the formation of the alkyl ammonium compound whereby the concentration of said alkyl ammonium compound is maintained therein at low effective concentrations throughout the crystallization such that the nitrogen content of the mother liquor is less than about 0.003 weight percent.

2. The process of claim 1 wherein the alkyl ammonium compound precursors consist of $C_1$-$C_{10}$ alkyl ammonium compound precursors.

3. The process of claim 2 wherein said alkyl ammonium compound is a tetraalkyl halogenated ammonium compound.

4. The process of claim 3 wherein said alkyl ammonium compound is tetrapropylammonium bromide.

5. The process of claim 4 wherein the precursor materials of tetrapropylammonium bromide are tri-n-propylamine and n-propyl bromide.

6. The process of claim 1 wherein said zeolite has at least one crystalline dimension greater than about 2 microns.

7. The process of claim 6 wherein said crystalline dimension is the large dimension of said zeolite, and is from about 3–5 microns.

8. The process of claim 1 wherein said nitrogen content of the mother liquor ranges between about 0.001 to 0.003 weight percent.

9. The process of claim 1 wherein said temperature is about 300° F.

10. A process for preparing ZSM-5 characterized by having at least one crystalline dimension of about 1 micron or more which comprises preparing an aluminosilicate gel and thereafter adding a mixture of alkyl ammonium compound precursors to said gel and raising the temperature of the resultant gel-mixture to about 320±100° F., a level sufficient to promote crystallization thereof, under agitation thereby dispersing said precursors uniformly throughout the mixture and inhibiting the formation of the alkyl ammonium compound whereby the concentration of said alkyl ammonium compound is maintained therein at low effective concentrations throughout the crystallization such that the nitrogen content of the mother liquor is less than about 0.003 weight percent.

* * * * *